United States Patent [19]
Schirmer

[11] Patent Number: 6,035,766
[45] Date of Patent: Mar. 14, 2000

[54] MULTI-HEATING ZONE COOKING POT CONSTRUCTION

[76] Inventor: Patricia C. Schirmer, 205 Ridge Ave., Apt. C02, Perkasie, Pa. 18944

[21] Appl. No.: 09/350,588

[22] Filed: Jul. 9, 1999

[51] Int. Cl.[7] .............................. A47J 27/00; A47J 27/06; B01D 23/20; B01D 35/02
[52] U.S. Cl. ................................. 99/403; 99/410; 99/448; 99/422; 126/369; 126/373; 126/390; 210/467; 210/469; 220/555; 220/912
[58] Field of Search .............................. 99/330, 339, 340, 99/403–410, 411–418, 444–446, 450, 448, 422; 126/373, 369, 390, 380; 210/464–469; 220/506, 626, 4.21, 552, 555, 912; D7/357, 667; 426/19, 27, 549, 523; 29/505, 521; 428/614, 626, 653

[56] References Cited

U.S. PATENT DOCUMENTS

| | | | |
|---|---|---|---|
| 1,319,878 | 10/1919 | Lewis | 99/448 X |
| 1,745,592 | 2/1930 | White | 220/555 X |
| 2,496,964 | 2/1950 | Steinhauer | 220/912 X |
| 2,515,617 | 7/1950 | Tilford | 126/390 |
| 4,614,852 | 9/1986 | Matsushita et al. | 220/455 X |
| 4,768,427 | 9/1988 | Cheng | 99/403 X |
| 4,926,843 | 5/1990 | Vocke et al. | 99/403 X |
| 5,178,761 | 1/1993 | Mohun | 210/469 |
| 5,357,850 | 10/1994 | Coudurier | 126/390 X |
| 5,396,834 | 3/1995 | Gambini | 99/422 |
| 5,506,062 | 4/1996 | Flammang | 126/390 X |
| 5,711,290 | 1/1998 | Kim | 126/390 |
| 5,809,630 | 9/1998 | Coissard | 99/422 X |

*Primary Examiner*—Timothy Simone
*Attorney, Agent, or Firm*—Henderson & Sturm LLP

[57] ABSTRACT

A multi heating zone cooking pot construction (10) including a receptacle unit comprising a receptacle member (20) having a base portion (21) and a peripheral sidewall (22) which are formed integrally with a divider unit (12) including a main divider wall member (30) and a secondary divider wall member (31) which divider the interior of the receptacle member (20) into segregated compartments (28, 29, 29') including an enlarged compartment (28) and two smaller compartments (29, 29'). The base portion (21) of each compartment is provided with a looped heat transfer coil (40) wherein the number of heat transfer loops (41) in at least two of the compartments (28, 29, 29') are different to produce more or less heat in the respective compartments (28, 29, 29').

9 Claims, 1 Drawing Sheet

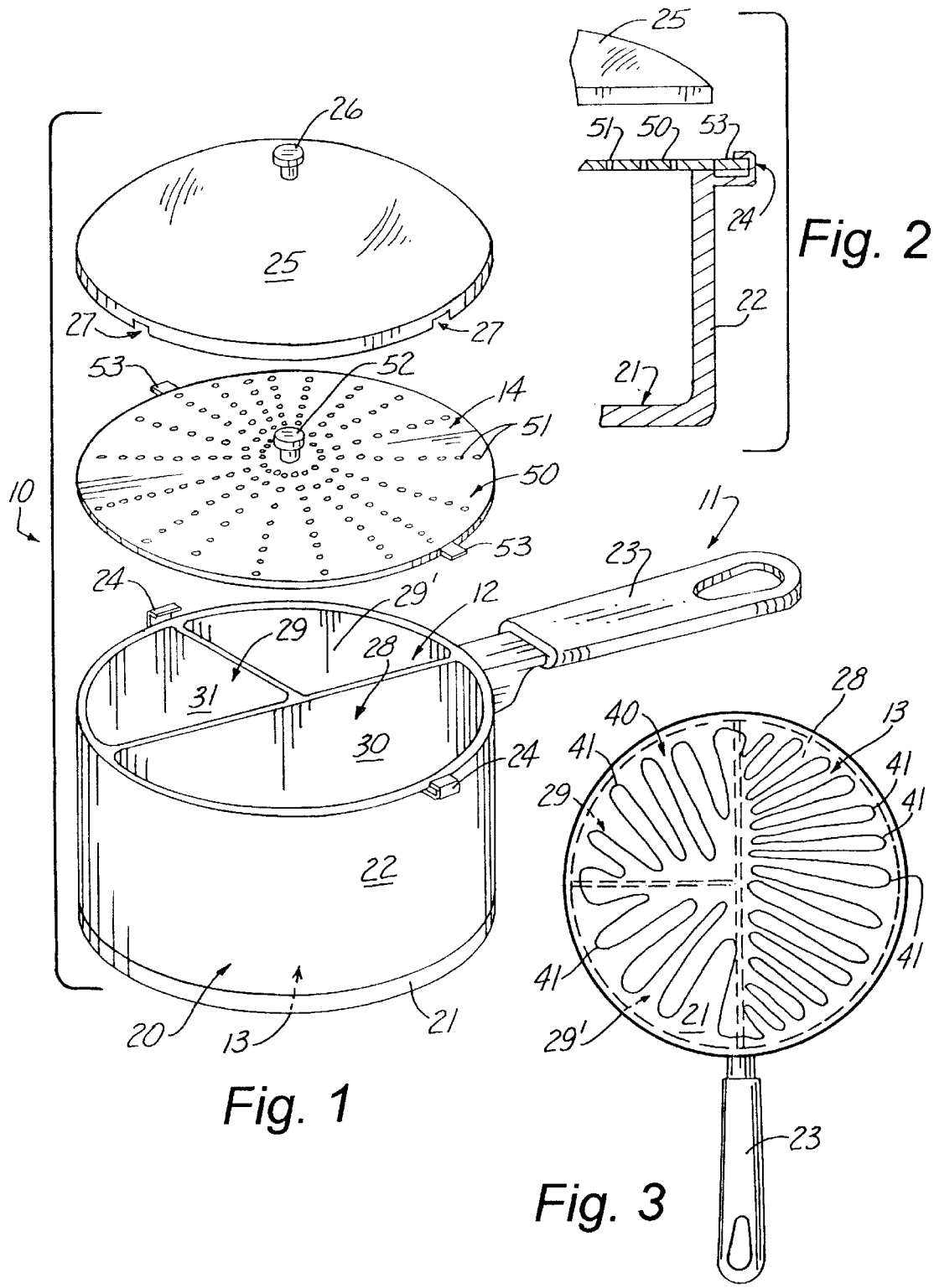

MULTI-HEATING ZONE COOKING POT CONSTRUCTION

BACKGROUND OF THE INVENTION

1. Field of the Invention

The present invention relates to the field of segmented cooking pots in general, and in particular to a segmented cooking pot construction having different heating zones.

2. Description of Related Art

As can be seen by reference to the following U.S. Pat. Nos. 1,319,878; 1,745, 592; 2,496,964; and 2,515,617, the prior art is replete with myriad and diverse segmented cooking pot constructions.

While all of the aforementioned prior art constructions are more than adequate for the basic purpose and function for which they have been specifically designed, they are uniformly deficient with respect to their failure to provide a simple, efficient, and practical method of cooking different foodstuffs at different temperatures in a single cooking receptacle.

As most cooks are all too well aware, one of the most vexing problems encountered in the preparation of any meal is various cooking times required for different food dishes and coordinating those different cooking times so that all of the foods are fully cooked at approximately the same time so that the meal can be prepared and served in an expeditious manner.

In addition, there are many instances wherein either limited resources and/or a limited amount of stove top space severely handicaps a person's ability to prepare a variety of different dishes for a meal.

As a consequence of the foregoing situation, there has existed a longstanding need for a new and improved type of segmented cooking pot construction that not only saves money and stove space, but which also allows a plurality of different foods to be prepared at different cooking temperatures in the same cooking receptacle, and the provision of such a construction is a stated objective of the present invention.

BRIEF SUMMARY OF THE INVENTION

Briefly stated, the multi-heating zone cooking pot construction that forms the basis of the present invention comprises in general, a receptacle unit, a divider unit, a variable heating zone unit, and a strainer unit.

As will be explained in greater detail further on in the specification, the divider unit is formed integrally with the receptacle unit to create a segmented cooking receptacle. The base portion of the receptacle unit is provided with the variable heating zone unit which is selectively aligned with the different internal compartments within the cooking receptacle.

This alignment of the heating zone unit relative to the base portion of the receptacle unit allows different cooking temperatures to be generated in the various internal compartments, so that the selective placement of different foods in the various compartments will result in all of the food dishes being fully cooked at approximately the same time.

In addition, the strainer unit is adapted to be releasably secured to the receptacle unit such that if one or more of the foodstuffs is cooked in boiling water, the liquid contents can be drained off before the different food dishes are removed from the receptacle unit for serving.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is an exploded perspective view of the multi heating zone cooking pot construction that forms the basis of the invention;

FIG. 2 is an isolated detail view of the locking engagement between the strainer unit and the receptacle unit; and FIG. 3 is a bottom plan view of the heating zone unit.

DETAILED DESCRIPTION OF THE INVENTION

As can be seen by reference to the drawings, and in particularly to FIG. 1, the multi-heating zone cooing pot construction that forms the basis of the present invention is designated generally by the reference number 10. The construction 10 comprises in general, a receptacle unit 11, a divider unit 12, a heating zone unit 13, and a strainer unit 14. These units will now be described in seriatim fashion.

As shown in FIGS. 1 through 3, the receptacle uni 11 comprises a cooking pot receptacle member 20 having a base portion 21, a raised peripheral sidewall 22, and an elongated handle element 23 which projects outwardly from a location on the upper portion of the sidewall 22 in a conventional manner. The opposite sides of the upper portion of the receptacle sidewall 22 are provided with a pair of generally C-shaped catch elements 24 whose purpose and function will be described presently.

In addition, the receptacle unit 11 further includes a receptacle lid member 25 dimensioned to fit over the top of the receptacle member 20 and having a centrally disposed handle element 26. The lid member 25 is provided with a plurality of spaced recesses 27 whose purpose and function will be explained further on in the specification.

As can best be seen by reference to FIGS. 1 and 3, the divider unit 12 comprises a plurality of divider wall members 30 and 31 which are formed integrally with the cooking pot receptacle member 20 and extend from the base portion 21 to the top of the receptacle sidewall 22 wherein the recesses 27 are dimensioned to receive the outer ends of the divider wall members 30 and 31.

The main divider wall member 30 extends diametrically across the interior of the receptacle member 20 and a secondary divider wall member 31 extends radially outwardly from the center of the main divider wall member 30 to divide the interior of the receptacle member 20 into one large compartment 28 and two smaller compartments 29.

In the preferred embodiment of the invention illustrated in FIG. 1, the top of the main divider wall member 30 is axially aligned with the longitudinal axis of the handle element 23 to both rigidify and strengthen the overall pot construction and facilitate the maneuverability thereof.

In addition, while the secondary divider wall member 31 is shown as forming two smaller compartments of equal size in FIG. 1, it is to be understood that it is within the scope of this invention to have divider wall member 31 disposed relative to the main divider wall member 30 so as to form two smaller compartments 29 of unequal size or to have the divider walls 30 and 31 rotated such that the secondary divider wall 31 is aligned with the axes of the handle element 23.

As can best be seen by reference to FIG. 3, the heating zone unit 13 comprises a contoured heat transfer coil 40 embedded in the base portion 21 of the receptacle member 20. The heat transfer coil 40 is configured into a series of sinusoidal loops 41 whose spacing relative to one another varies in accordance with the particular internal compartment 28, 29, or 29' that the particular section of heat transfer coil 40 is disposed beneath.

In the preferred embodiment of the invention depicted in FIG. 3, the enlarged compartment 28 is provided with the greatest number of coil loops 41 whereas, lesser numbers of coil loops 41 are provided in each of the smaller compartments 29, 29' to provide different heat transfer characteristics to the larger 28 and smaller 29, 29' compartments, respectively.

Returning once more to FIGS. 1 and 2, it can be seen that the strainer unit 14 comprises a generally flat disk shaped strainer member 50 provided with a plurality of strainer apertures 51 and a centrally disposed handle element 52.

The opposite sides of the strainer member 50 are provided with a pair of outwardly projecting tangs 53 which are dimensioned to be releasably received in the catch elements 24 on the upper portion of the receptacle member 20.

This arrangement allows the user to temporarily lock the strainer member 50 in place on the receptacle member 20 such that the inversion of the receptacle member 20 will drain any unwanted liquid contents from the interior compartments 28, 29, 29' prior to the solid foodstuffs being removed from the receptacle member 20 in the usual fashion.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A multi-heating zone cooking pot construction comprising:
   a receptacle unit including a receptacle member having a base portion, a raised peripheral sidewall extending upwardly from the base portion and a handle element extending outwardly from the sidewall;
   a divider unit formed integrally with the receptacle unit and including a main wall divider member extending both diametrically across the interior of receptacle member, and upwardly from the base portion of the receptacle member to divide the interior of the receptacle member into two segregated compartments; and
   a heating zone unit including a heat transfer coil formed in the base portion of the receptacle member and arranged into a pattern of loops wherein each of the segregated compartments are provided with a different number of loops.

2. The construction as in claim 1 wherein the divider unit further includes another wall divider member extending outwardly from the main wall divider member to create one enlarged compartment and two smaller compartments within the interior of the receptacle member.

3. The construction as in claim 2 wherein the two smaller compartments are of equal size.

4. The construction as in claim 2 wherein the two smaller compartments are of different sizes.

5. The construction as in claim 2 wherein each of the smaller compartments are provided with the same number of loops of the heat transfer coil.

6. The construction as in claim 2 wherein each of the smaller compartments are provided with a different number of loops of the heat transfer coil.

7. The construction as in claim 2 wherein all of the compartments are provided with a different number of loops of the heat transfer coil.

8. The construction as in claim 1 further comprising:
   a strainer unit releasably associated with the upper portion of the receptacle member.

9. The construction as in claim 8 wherein the upper portion of the receptacle member is provided with a pair of opposed catch elements, and the strainer unit includes a generally flat strainer member having opposed tangs which project outwardly from the strainer member and are adapted to be releasably received in the said catch elements.

* * * * *